US012470005B2

(12) United States Patent
Maesoba et al.

(10) Patent No.: US 12,470,005 B2
(45) Date of Patent: Nov. 11, 2025

(54) SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 378 days.

(21) Appl. No.: 17/792,022

(22) PCT Filed: Dec. 25, 2020

(86) PCT No.: PCT/JP2020/048633
§ 371 (c)(1),
(2) Date: Jul. 11, 2022

(87) PCT Pub. No.: WO2021/145195
PCT Pub. Date: Jul. 22, 2021

(65) Prior Publication Data

US 2023/0046729 A1 Feb. 16, 2023

(30) Foreign Application Priority Data

Jan. 15, 2020 (JP) ................................ 2020-004085

(51) Int. Cl.
*H01R 13/6591* (2011.01)
*H01R 13/424* (2006.01)
*H01R 13/428* (2006.01)

(52) U.S. Cl.
CPC ......... *H01R 13/424* (2013.01); *H01R 13/428* (2013.01); *H01R 13/65912* (2020.08)

(58) Field of Classification Search
CPC ................ H01R 13/424; H01R 13/428; H01R 13/65912
See application file for complete search history.

(56) References Cited

U.S. PATENT DOCUMENTS 8,926,368 B2 * 1/2015 Il .......................... H01R 13/658 439/607.5
10,741,957 B2 * 8/2020 Hara .................... H01R 13/426
(Continued)

FOREIGN PATENT DOCUMENTS

JP 2008-181810 A 8/2008
WO WO-2018003466 A1 * 1/2018 ........... H01R 13/426

OTHER PUBLICATIONS

International Search Report issued on Mar. 9, 2021 for WO 2021/145195 A1 (4 pages).

*Primary Examiner* — Vanessa Girardi
(74) *Attorney, Agent, or Firm* — Venjuris, P.C.

(57) ABSTRACT

A shield connector is provided with an inner conductor, a dielectric for accommodating the inner conductor, and an outer conductor for surrounding the dielectric. The dielectric includes a stopper portion for stopping a movement of the dielectric along a wall surface of the outer conductor by abutting on the outer conductor. A displacement of the dielectric with respect to the outer conductor can be prevented by the abutment of the stopper portion on the outer conductor.

4 Claims, 8 Drawing Sheets

(56) References Cited

U.S. PATENT DOCUMENTS

| | | | | |
|---|---|---|---|---|
| 12,300,939 | B2 * | 5/2025 | Maesoba ............ | H01R 13/6593 |
| 2011/0300750 | A1 | 12/2011 | Nagawatari et al. | |
| 2013/0288523 | A1 | 10/2013 | Rosuke, II | |
| 2018/0261945 | A1 * | 9/2018 | Maesoba .............. | H01R 13/422 |
| 2019/0157809 | A1 | 5/2019 | Maesoba et al. | |
| 2019/0288456 | A1 | 9/2019 | Maesoba et al. | |

* cited by examiner

SHIELD CONNECTOR

CROSS REFERENCE TO RELATED APPLICATIONS

This application is a national phase of PCT application No. PCT/JP2020/048633, filed on 25 Dec. 2020, which claims priority from Japanese patent application No. 2020-004085, filed on 15 Jan. 2020, all of which are incorporated herein by reference.

TECHNICAL FIELD

The present disclosure relates to a shield connector.

BACKGROUND

Patent Document 1 discloses a shield connector connected to a shielded cable for communication. This shield connector includes a terminal fitting connected to a shield wire of the shielded cable, a housing (hereinafter, referred to as a dielectric) for accommodating the terminal fitting, and a shield shell for surrounding the housing. The shield shell includes a barrel portion to be crimped to a sheath of the shielded cable. A shield connector of this type is also disclosed in Patent Document 2.

PRIOR ART DOCUMENT

Patent Document

Patent Document 1: JP 2013-229255 A
Patent Document 2: JP 2012-018898 A

SUMMARY OF THE INVENTION

Problems to be Solved

In the case of Patent Document 1, the sheath of the shielded cable is fixed by the barrel portion with the dielectric inserted in the shield shell. When the barrel portion is crimped, the dielectric may be displaced with respect to the shield shell.

Accordingly, the present disclosure aims to provide a shield connector capable of preventing a displacement of a dielectric.

Means to Solve the Problem

The present disclosure is directed to a shield connector with an inner conductor, a dielectric for accommodating the inner conductor, and an outer conductor for surrounding the dielectric, the dielectric including a stopper portion for stopping a movement of the dielectric along a wall surface of the outer conductor by abutting on the outer conductor.

Effect of the Invention

According to the present disclosure, it is possible to provide a shield connector capable of preventing a displacement of a dielectric.

DETAILED DESCRIPTION TO EXECUTE THE INVENTION

[Description of Embodiments of Present Disclosure]

Figure 1:
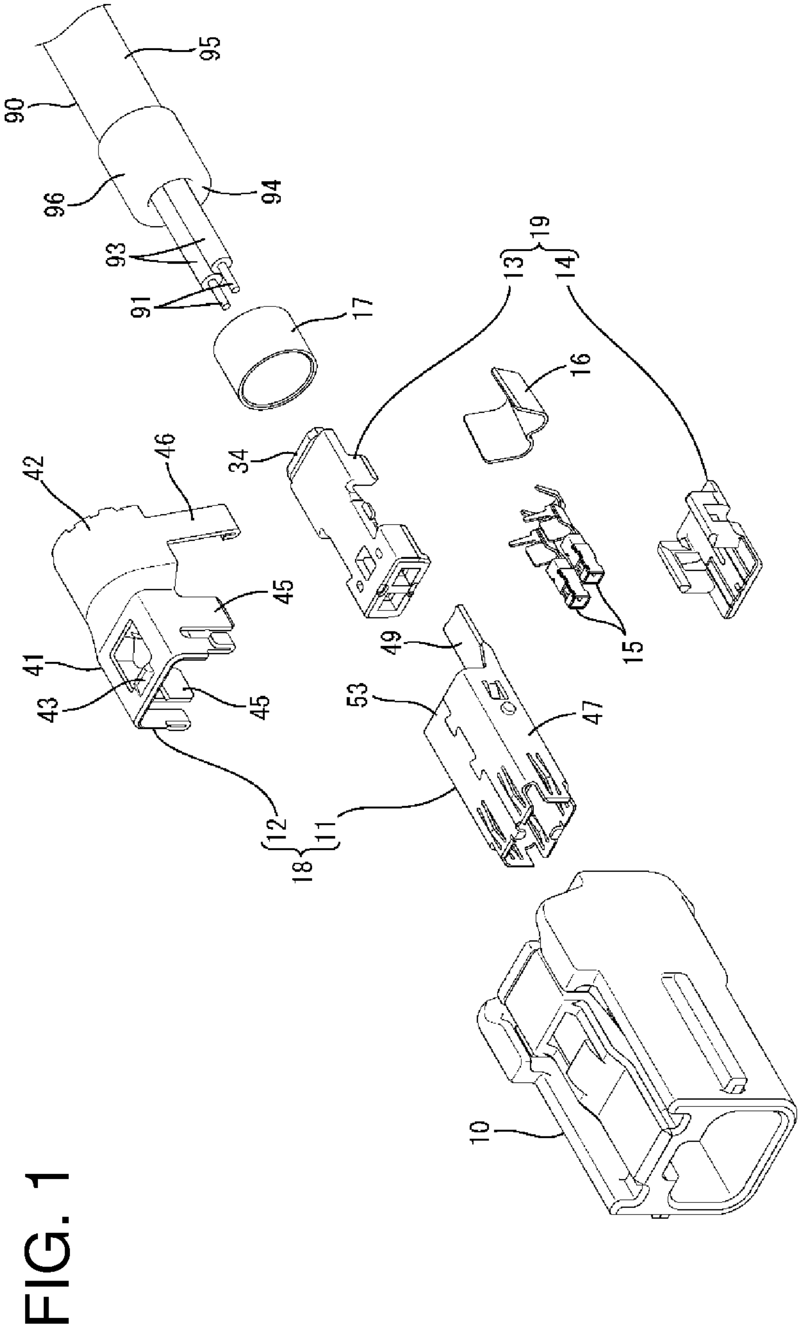
FIG. 1 is an exploded perspective view of a shield connector.

First, embodiments of the present disclosure are listed and described.

(1) A shield connector of the present disclosure is provided with an inner conductor, a dielectric for accommodating the inner conductor, and an outer conductor for surrounding the dielectric, the dielectric including a stopper portion for stopping a movement of the dielectric along a wall surface of the outer conductor by abutting on the outer conductor. For example, when the outer conductor is crimped, a movement of the dielectric along the wall surface of the outer conductor can be stopped by the abutment of the stopper portion on the outer conductor. Thus, according to the above configuration, a displacement of the dielectric with respect to the outer conductor can be prevented.

(2) Preferably, the dielectric includes a supporting member for positioning the inner conductor and a cover member to be attached to the supporting member, and the stopper portion is provided on the supporting member. According to this, the inner conductor is positioned by the supporting member and, in addition, a relative position of the inner conductor with respect to the outer conductor can be determined via the stopper portion of the supporting member. Thus, a distance between the inner conductor and the outer conductor can be kept constant and an impedance can be accurately adjusted.

(3) The stopper portion may be shaped to project into a space in the outer conductor. According to this, an air layer constituting the space in the outer conductor is replaced by a resin constituting the stopper portion in a projecting region of the stopper portion in the outer conductor. As a result, the stopper portion can exhibit a function of adjusting an impedance.

(4) The outer conductor includes a tubular outer conductor body portion open forward and rearward, the outer conductor body portion includes a stopper receiving portion on a rear end, the stopper portion abutting on the stopper receiving portion, and a rear part including the rear end, out of the outer conductor body portion, is thicker than a front part including a front end. A forward movement (displacement) of the dielectric with respect to the outer conductor can be prevented by the abutment of the stopper portion on the stopper receiving portion. Particularly, since the stopper receiving portion is provided in the thick rear part of the outer conductor body portion, a concern for deformation during interference with the stopper portion can be reduced. On the other hand, since being thinner than the rear part, the front part of the outer conductor body portion has, for example, a spring structure to be deflected and deformed.

[Details of Embodiment of Present Disclosure]

A specific example of a shield connector of the present disclosure is described below with reference to the drawings. Note that the present invention is not limited to these illustrations and is intended to be represented by claims and include all changes in the scope of claims and in the meaning and scope of equivalents.

<Embodiment>

A shield connector of an embodiment includes, as shown in FIG. 1, a housing 10, a first outer conductor 11, a second outer conductor 12, a supporting member 13, a cover member 14, a pair of inner conductors 15, a clip 16 and a sleeve 17. The first and second outer conductors 11, 12 are assembled with each other to constitute an outer conductor 18. The supporting member 13 and the cover member 14 are assembled with each other to constitute a dielectric 19. Out of the shield connector, a part except the housing 10 is configured as a terminal module 20 (see FIG. 2). Note that, in the following description, an oblique left lower side of FIG. 1 is defined as a front side concerning a front-rear direction, and a vertical direction is based on a vertical direction shown in FIG. 1.

The terminal module 20 is connected to an end part of a shielded cable 90. As shown in FIG. 1, the shielded cable 90 includes a pair of coated wires 93 in which internal conductors 91 are surrounded by insulation coatings, a shield layer 94 such as a braided wire collectively surrounding the pair of coated wires 93, and a sheath 95 surrounding the shield layer 94. A front end part of the shield layer 94 is folded rearward and laid on the outer periphery of the sheath 95 to constitute a folded portion 96.

The sleeve 17 is made of metal, has a hollow cylindrical shape and is mounted between the outer periphery of the sheath 95 and the folded portion 96 of the shield layer 94. The clip 16 is made of metal and in the form of a plate piece and holds front end parts of the pair of coated wires 93 in a positioned state.

The pair of inner conductors 15 are connected to the pair of internal conductors 91. Each inner conductor 15 is positioned by the supporting member 13 and accommodated in the dielectric 19 while being sandwiched between the supporting member 13 and the cover member 14 (see FIG. 2).

The dielectric 19 (supporting member 13 and cover member 14) is made of synthetic resin.

Figure 5:
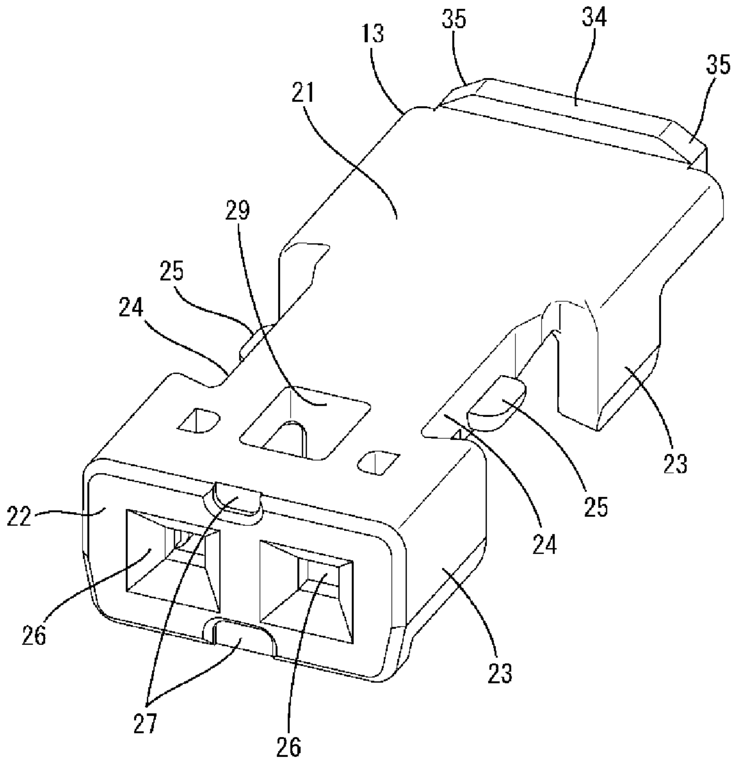
FIG. 5 is a perspective view of a supporting member.

The supporting member 13 constitutes an upper part of the dielectric 19. As shown in FIG. 5, the supporting member 13 includes a supporting body portion 21 in the form of a rectangular plate extending along the front-rear direction and a lateral direction (width direction), a front wall portion 22 projecting downward of the supporting body portion 21 on a front side of the supporting body portion 21 and having a rectangular outer shape when viewed from front, and a pair of front and rear side wall portions 23 projecting downward of the supporting body portion 21 on each of left and right ends of the supporting body portion 21. The respective side wall portions 23 are divided on front and rear sides via cut portions 24. The pair of front side wall portions 23 are coupled to left and right ends of the front wall portion 22. The respective cut portions 24 are open in the upper surface of the supporting body portion 21 via the left and right ends of the supporting body portion 21. The supporting body portion 21 includes a pair of left and right lock projections 25 on opening end surfaces of the respective cut portions 24. Each lock projection 25 protrudes into each cut portion 24.

The front wall portion 22 includes a pair of left and right insertion holes 26. When the shield connector is connected to an unillustrated mating connector, a pair of mating terminals mounted in the mating connector are inserted through the pair of insertion holes 26. Each mating terminal is tab-like or pin-like and connected to each inner conductor 15. The front wall portion 22 includes a pair of upper and lower recesses 27 in the form of cutouts on both upper and lower ends of a front surface and at positions between the respective insertion holes 26 in the lateral direction.

Figure 6:
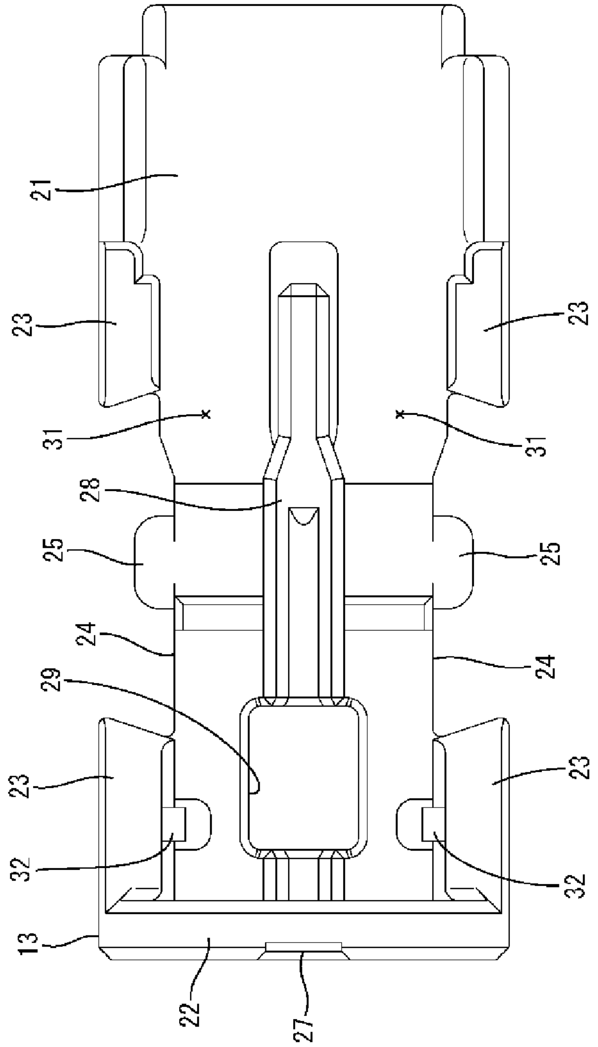
FIG. 6 is a bottom view of the supporting member.

As shown in FIG. 6, the supporting body portion 21 includes a rib-like partition wall 28 extending in the front-rear direction in a laterally central part of a lower surface. The front end of the partition wall 28 is coupled to a part of the rear surface of the front wall portion 22 between the respective insertion holes 26. The partition wall 28 is divided into front and rear parts via an opening 29 penetrating through the supporting body portion 21 at a position near the front wall portion 22. An unillustrated member for adjusting an impedance can be inserted into the opening 29 between the front and rear parts of the partition wall 28.

Figure 2:
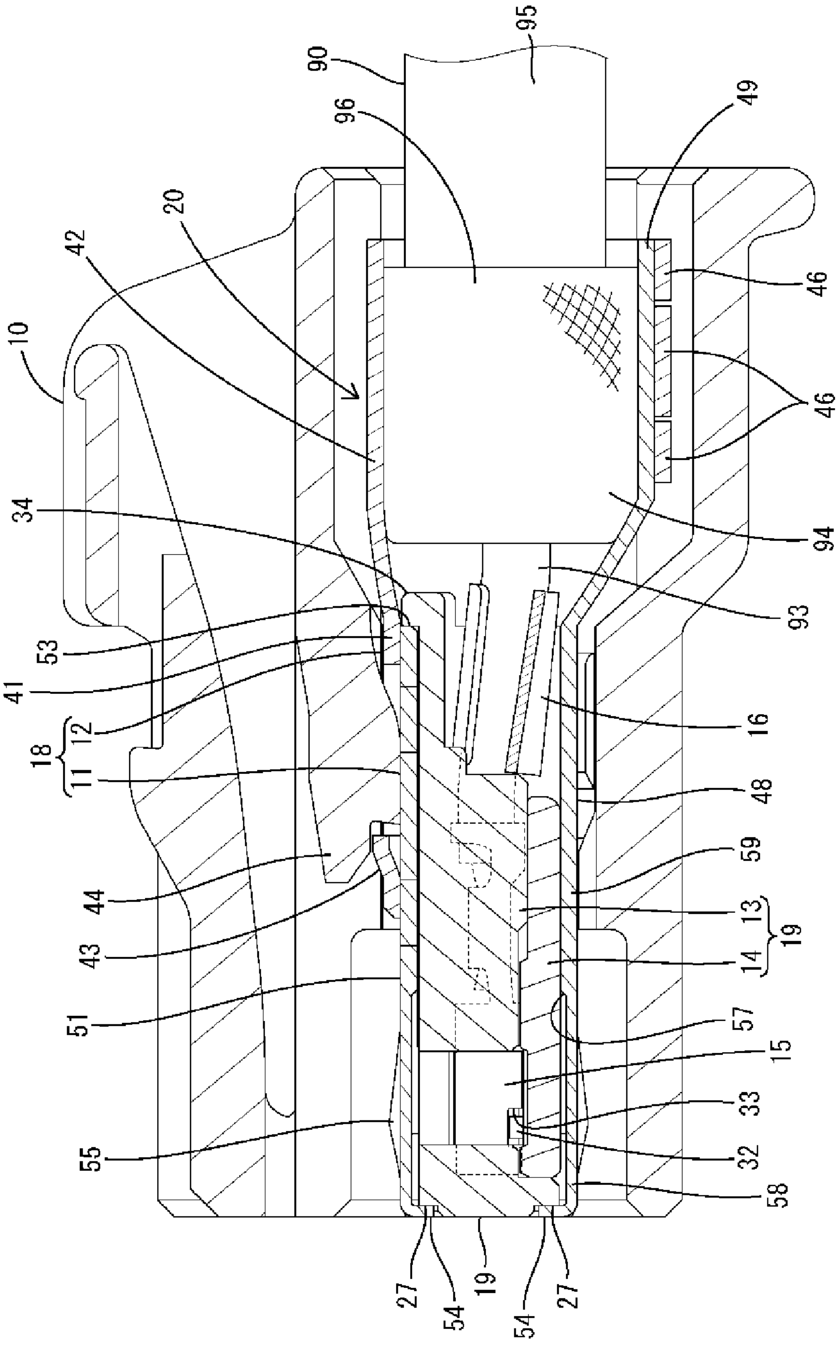
FIG. 2 is a side view in section of the shield connector.

The supporting member 13 includes a pair of terminal accommodating portions 31 on both left and right sides of the partition wall 28. The pair of terminal accommodating portions 31 are defined as recesses by the front wall portion 22, the partition wall 28 and the pairs of the side wall portions 23. The pair of inner conductors 15 are accommodated into the pair of terminal accommodating portions 31. The pair of front side wall portions 23 include a pair of locking portions 32 at positions near lower ends. Each locking portion 32 is in the form of a projection and projects into each terminal accommodating portion 31. Each inner conductor 15 is inserted into the corresponding terminal accommodating portion 31 from below and positioned in the front-rear direction with respect to the supporting member 13 by fitting the locking portion 32 into a lock receiving portion 33 of a box-shaped part as shown in FIG. 2.

The supporting member 13 includes a stopper portion 34. The stopper portion 34 is in the form of a rib projecting upward from a rear end part of the upper surface of the supporting body portion 21 and extending in the lateral direction. The stopper portion 34 is arranged rearward of the pair of rear side wall portions 23. In short, the stopper portion 34 is arranged on the rearmost end of the dielectric 19.

As shown in FIG. 5, the stopper portion 34 has a rectangular cross-sectional shape and is shaped to have a constant projecting dimension (vertical dimension) in the lateral direction except at left and right end parts. The left and right end parts of the stopper portion 34 are arranged near the pair of rear side wall portions 23. The left and right end parts of the stopper portion 34 have left and right corners cut off and have a pair of slopes 35 inclined downward toward both lateral sides. The front surface of the stopper portion 34 is a vertical surface extending along the vertical direction and lateral direction as a whole. The front surface of the stopper portion 34 can abut on a stopper receiving portion 53 to be described later (see FIG. 2).

Figure 7:
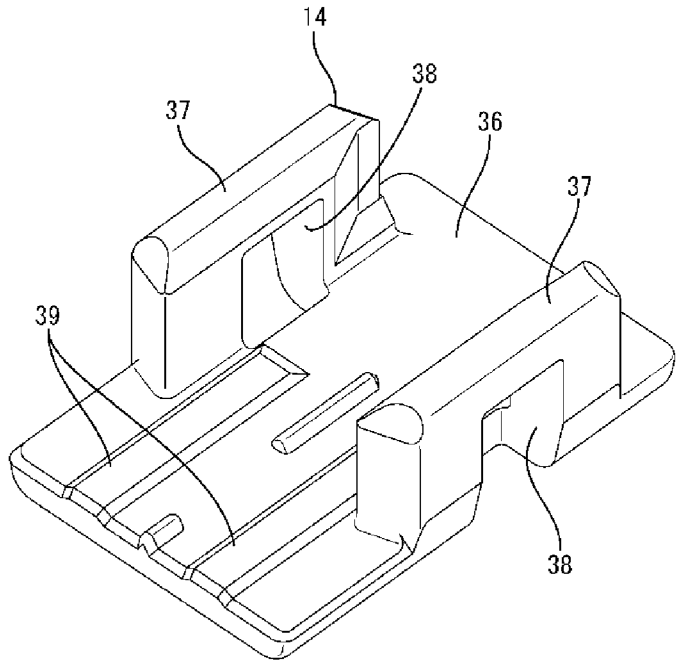
FIG. 7 is a perspective view of a cover member.

The cover member 14 constitutes a lower part of the dielectric 19. As shown in FIG. 7, the cover member 14 includes a cover body portion 36 in the form of a rectangular plate and a pair of lock piece 37 projecting upward from left and right end parts of the cover body portion 36. Each lock piece 37 is in the form of a gate-shaped frame and includes a lock hole 38 inside.

Figure 4:
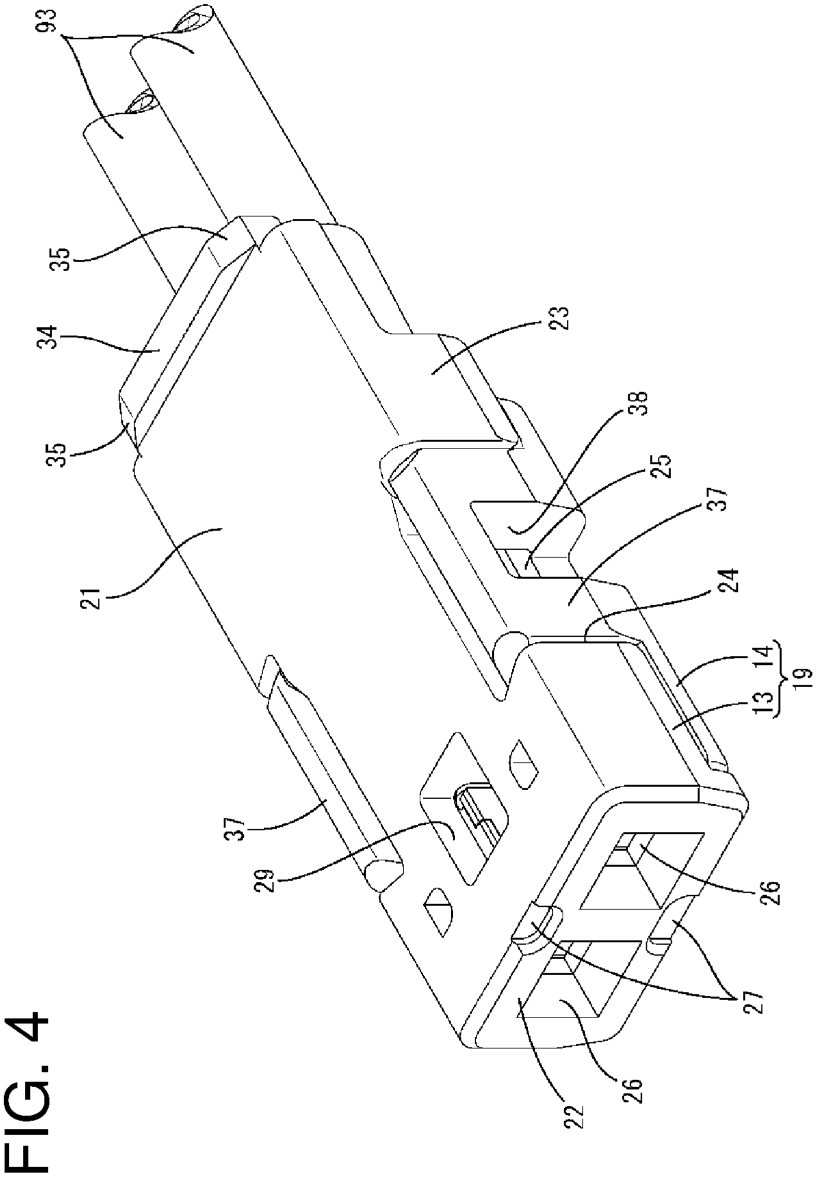
FIG. 4 is a perspective view of a dielectric accommodating inner conductors.

In the process of assembling the cover member 14 with the supporting member 13, the respective lock pieces 37 interfere with the respective lock projections 25 and are deflected and deformed laterally outward away from each other. Thereafter, the respective lock pieces 37 are resiliently restored and enter the respective cut portions 24, and the respective lock projections 25 are fit into the respective lock holes 38 (see FIG. 4). When the cover member 14 is assembled with the supporting member 13, the cover body portion 36 closes openings in the lower surfaces of the pair of terminal accommodating portions 31. The cover body portion 36 includes a pair of left and right pressing portions 39 on an upper surface. The respective pressing portions 39 are in the form of flat bases and sandwich and hold the respective inner conductors 15 between the supporting body portion 21 and the pressing portions 39.

The outer conductor 18 (first and second outer conductors 11, 12) is made of a metal plate material and surrounds the inner conductors 15 and the dielectric 19.

As shown in FIG. 1, the second outer conductor 12 includes a covering portion 41 in the form of a box with an open lower surface and a crimping portion 42 in the form of an open barrel projecting rearward from the rear end of the covering portion 41. The covering portion 41 includes a locking projection 43 projecting on a front end part of an upper surface. The locking projection 43 is locked to a locking lance 44 of the housing 10 (see FIG. 2). The covering portion 41 includes a pair of holding pieces 45 projecting downward from both left and right sides. The crimping portion 42 includes a plurality of crimping pieces 46 projecting downward from both left and right sides.

Figure 8:
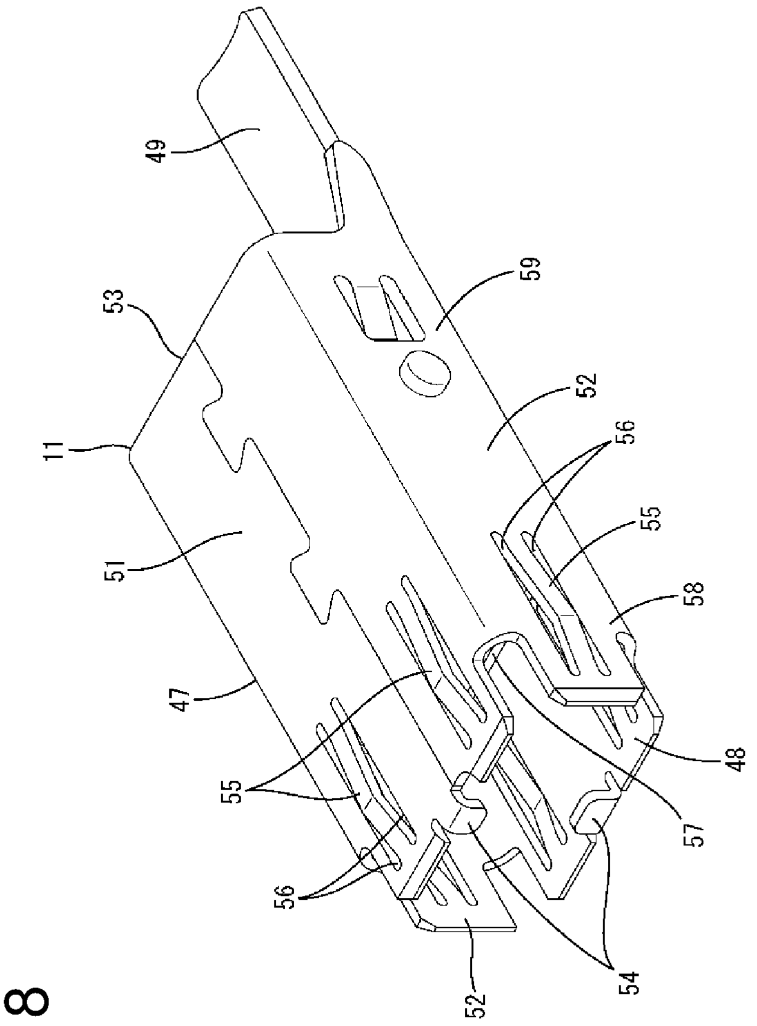
FIG. 8 is a perspective view of a first outer conductor.

As shown in FIG. 8, the first outer conductor 11 includes an outer conductor body portion 47 in the form of a rectangular tube and a projecting portion 49 projecting rearward from the rear end of a later-described lower plate portion 48 of the outer conductor body portion 47. The outer conductor body portion 47 includes an upper plate portion 51, the lower plate portion 48 located below the upper plate portion 51, and a pair of left and right side plate portions 52 linking left and right ends of the upper plate portion 51 and left and right ends of the lower plate portion 48. The rear end of the upper plate portion 51 is arranged linearly along the lateral direction. The rear end of this upper plate portion 51 is configured as the stopper receiving portion 53 on which the stopper portion 34 abuts (see FIG. 2).

As shown in FIG. 8, the upper plate portion 51 and the lower plate portion 48 include a pair of upper and lower projecting pieces 54 bent inwardly to face each other in laterally central parts of the front ends thereof. Each projecting piece 54 is in the form of a rectangular plate and can be fit into the recess 27 (see FIG. 2). Each of the upper plate portion 51 and the lower plate portion 48 includes a pair of left and right resilient portions 55. Each of the pair of left and right side plate portions 52 includes one resilient portion 55. Each resilient portion 55 is arranged between slits 56 extending in parallel to the front-rear direction in each plate portion 48, 51, 52. Further, each resilient portion 55 is bent into a chevron shape projecting outwardly of the outer conductor body portion 47. Each resilient portion 55 is deflectable and deformable with both front and rear ends as fulcrums.

A step 57 in an in-out direction (radial direction) is formed over the entire periphery on the inner surface of the outer conductor body portion 47. In the outer conductor body portion 47, a front part 58 located on a front side, out of both front and rear sides of the step 57, is formed thinner than a rear part 59 located on the rear side. As shown in FIG. 2, the inner surface of the front part 58 is arranged more outward than that of the rear part 59 via the step 57. On the other hand, the outer surface of the front part 58 is flush and continuous with that of the rear part 59.

The front part 58 is configured in a region from the front end of the outer conductor body portion 47 to the step 57. Each resilient portion 55 is included in the front part 58. By forming the front part 58 thinner than the rear part 59, each resilient portion 55 is smoothly deflected. On the other hand, the rear part 59 is configured in a region from the step 57 to the rear end of the outer conductor body portion 47. The stopper receiving portion 53 is included in the rear part 59. By forming the rear part 59 thicker than the front part 58, the durability of the stopper receiving portion 53 can be improved.

Next, a manufacturing method and functions of the terminal module 20 are described.

First, each inner conductor 15 is inserted into each terminal accommodating portion 31 and the cover member 14 is locked and attached to the supporting member 13 by the locking of each lock piece 37 and each lock projection 25, whereby the dielectric 19 is configured. Each inner conductor 15 is positioned by the locking portion 32 of the supporting member 13 and sandwiched and held between the supporting member 13 and the cover member 14.

Subsequently, the dielectric 19 is inserted into the outer conductor body portion 47 from behind. Each projecting piece 54 of the outer conductor body portion 47 is fit into each recess 27 of the front wall portion 22 and the front surface of the stopper portion 34 abuts on the stopper receiving portion 53 of the outer conductor body portion 47, whereby an inserting operation of the dielectric 19 is stopped. When the dielectric 19 is properly inserted into the outer conductor body portion 47, the folded portion 96 of the shield layer 94 is arranged on the projecting portion 49. A gap is formed between the outer surface of the dielectric 19 and the inner surface of the front part 58 (see FIG. 2). Each resilient portion 55 can be deflected and deformed toward the gap.

Subsequently, the covering portion 41 is arranged to be put on a rear part of the outer conductor body portion 47 from above. In that state, the respective holding pieces 45 are bent inwardly and crimped to embrace the lower plate portion 48 and the crimping portion 42 is crimped to the outer periphery of the folded portion 96. By locking tip parts of the respective crimping pieces 46 to the projecting portion 49, the outer conductor 18 and the shield layer 94 are electrically conductively connected.

Figure 3:
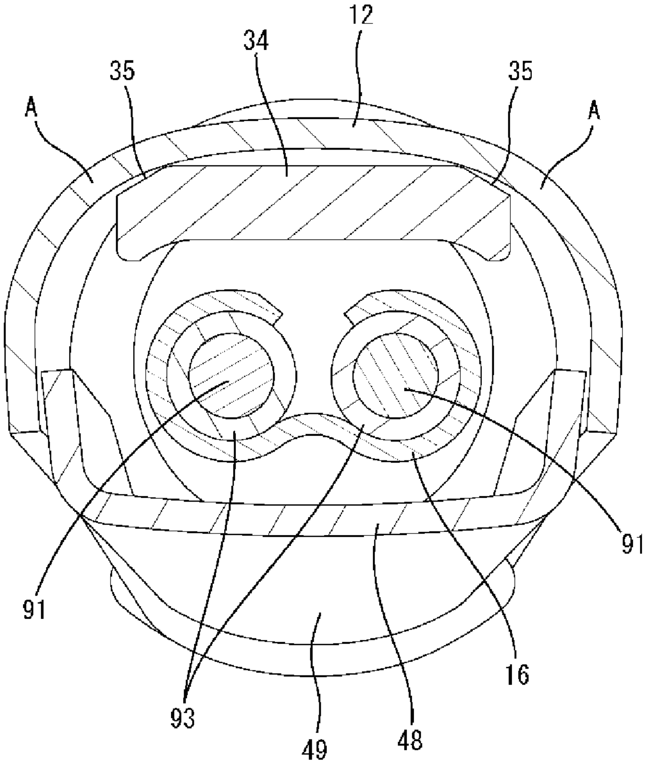
FIG. 3 is a transverse section showing a state of a crimped outer conductor.

Here, the stopper portion 34 is arranged forward of the folded portion 96 and below a boundary region between the covering portion 41 and the crimping portion 42 in a space in the second outer conductor 12 (see FIG. 2). The upper surface of the stopper portion 34 is arranged in contact with or in proximity to the inner surface of the second outer conductor 12. In a crimping step of the crimping portion 42 and the like, both left and right end parts of the upper wall of the second outer conductor 12 are deformed to be curved downward. As shown in FIG. 3, deformed parts (parts indicated by A of FIG. 3) of the upper wall of the second outer conductor 12 are proximate to both left and right end parts of the stopper portion 34, but arranged away from the respective slopes 35. In other words, the respective slopes 35 of the stopper portion 34 are shaped to be retracted away from the deformed parts of the upper wall of the second outer conductor 12.

Further, in the crimping step of the crimping portion 42 and the like, the first outer conductor 11 and the dielectric 19 receive a crimping force from the side of the second outer conductor 12 and a displacement force for moving the dielectric 19 forward with respect to the first outer conductor 11 is applied to the dielectric 19.

However, in the case of this embodiment, even if the displacement force is applied to the dielectric 19, the front surface of the stopper portion 34 is stopped in contact with the stopper receiving portion 53 of the outer conductor body portion 47 or a state where the front surface of the stopper portion 34 is stopped in contact with the stopper receiving portion 53 is maintained. Thus, a forward movement of the dielectric 19 with respect to the first outer conductor 11 is hindered. As a result, relative positions of the outer conductor 18 and the dielectric 19 are kept constant and, consequently, a distance between each inner conductor 15 and the outer conductor 18 is also kept constant to suppress an impedance variation.

Note that when the above displacement force is applied to the dielectric 19, the back surface of each recess 27 also abuts on each projecting piece 54, thereby fulfilling a function of hindering a movement of the dielectric 19 with respect to the first outer conductor 11. Of course, since the front part 58 is thin and a projecting amount of each projecting piece 54 is small, the function of restricting a displacement of the dielectric 19 by the abutment of the back surface of each recess 27 on each projecting piece 54 only assists a displacement restricting function by the stopper portion 34.

The terminal module 20 completed in the above way is inserted into the housing 10 and retained in the housing 10 by the locking projection 43 being locked by the locking lance 44 (see FIG. 2). Thereafter, the housing 10 is connected to the unillustrated mating connector, an unillustrated tubular mating outer conductor surrounds the outer periphery of the front part 58 of the outer conductor body portion 47, and each resilient portion 55 electrically conductively contacts the inner periphery of the mating outer conductor.

As described above, according to this embodiment, when the second outer conductor 12 is crimped to the first outer conductor 11, the stopper portion 34 abuts on the outer conductor 18, whereby the dielectric 19 can be stopped to move forward along the inner surface (wall surface) of the outer conductor body portion 47. Thus, a displacement of the dielectric 19 with respect to the first outer conductor 11, consequently the outer conductor 18, can be prevented.

Further, since the stopper portion 34 is provided on the supporting member 13 and the supporting member 13 includes the locking portions 32 for positioning the respective inner conductors 15, relative positions of the respective inner conductors 15 and the outer conductor 18 are also determined and an impedance can be accurately adjusted.

Furthermore, since the stopper portion 34 is shaped to project into the space in the outer conductor 18, the space in the outer conductor 18 can be filled by a projecting region of the stopper portion 34. In other words, an air layer constituting the space in the outer conductor 18 is replaced by a resin layer constituting the stopper portion 34 in the projecting region of the stopper portion 34 in the outer conductor 18. Thus, the stopper portion 34 can exhibit a function of adjusting an impedance.

Furthermore, since the rear part 59 including the stopper receiving portion 53, out of the outer conductor body portion 47, is thicker than the front part 58, a concern for deformation due to interference with the stopper portion 34 can be reduced. On the other hand, since each resilient portion 55 is provided in the front part 58 thinner than the rear part 59, each resilient portion 55 can be smoothly deflected and deformed.

[Other Embodiments]

The embodiment disclosed this time should be considered illustrative in all aspects, rather than restrictive.

Although the outer conductor body portion has a rectangular tube shape in the above embodiment, the outer conductor may have a hollow cylindrical shape as another embodiment.

Although the outer conductor is composed of two members including the first outer conductor and the second outer conductor in the above embodiment, the outer conductor may be composed of an inseparable single component as another embodiment.

Although the dielectric is composed of the supporting member and the cover member in the above embodiment, the dielectric may be composed of an inseparable single component as another embodiment.

Although the stopper portion is configured to abut on the rear end of the outer conductor body portion in the above embodiment, the stopper portion may be configured to abut on a step part or the like provided at an intermediate position in the front-rear direction of the outer conductor as another embodiment.

Although the stopper portion is configured to restrict a forward movement of the dielectric with respect to the outer conductor in the above embodiment, the stopper portion may be configured to restrict a rearward or lateral movement of the dielectric with respect to the outer conductor as another embodiment.

Although the pair of inner conductors are provided in the above embodiment, the number of the inner conductors is not limited and may be one, three or more as another embodiment.

LIST OF REFERENCE NUMERALS

10 . . . housing
11 . . . first outer conductor
12 . . . second outer conductor
13 . . . supporting member
14 . . . cover member
15 . . . inner conductor
16 . . . clip
17 . . . sleeve
18 . . . outer conductor
19 . . . dielectric
20 . . . terminal module
21 . . . supporting body portion
22 . . . front wall portion
23 . . . side wall portion
24 . . . cut portion
25 . . . lock projection
26 . . . insertion hole
27 . . . recess
28 . . . partition wall
29 . . . opening
31 . . . terminal accommodating portion
32 . . . locking portion
33 . . . lock receiving portion
34 . . . stopper portion
35 . . . slope
36 . . . cover body portion
37 . . . lock piece
38 . . . lock hole
39 . . . pressing portion
41 . . . covering portion
42 . . . crimping portion
43 . . . locking projection
44 . . . locking lance
45 . . . holding piece
46 . . . crimping piece

47 . . . outer conductor body portion
48 . . . lower plate portion
49 . . . projecting portion
51 . . . upper plate portion
52 . . . side plate portion
53 . . . stopper receiving portion
54 . . . projecting piece
55 . . . resilient portion
56 . . . slit
57 . . . step
58 . . . front part
59 . . . rear part
90 . . . shielded cable
91 . . . internal conductor
93 . . . coated wire
94 . . . shield layer
95 . . . sheath
96 . . . folded portion
A . . . deformed part

What is claimed is:

1. A shield connector, comprising:

an inner conductor to be connected to a cable;

a dielectric for accommodating the inner conductor; and an outer conductor for surrounding the dielectric, wherein the dielectric includes a stopper portion for stopping a movement of the dielectric along a wall surface of the outer conductor by abutting on the outer conductor, the outer conductor includes a first outer conductor and a second outer conductor assembled with each other, the first outer conductor includes a tubular outer conductor body portion open forward and rearward, the outer conductor body portion including a stopper receiving portion on a rear end, the second outer conductor includes a covering portion to be arranged on a rear part of the outer conductor body portion of the first outer conductor and a crimping portion projecting rearward from a rear end of the covering portion, and the stopper portion projects from a rear end of the dielectric into a space in the covering portion of the second outer conductor to abut on a rear end of the stopper receiving portion of the first outer conductor such that the stopper portion is between the covering portion and the cable.

2. The shield connector according to claim 1, wherein:

the dielectric includes a supporting member for positioning the inner conductor and a cover member to be attached to the supporting member, and the stopper portion is provided on the supporting member.

3. The shield connector according to claim 1, wherein:

a rear part including the rear end, out of the outer conductor body portion, is thicker than a front part including a front end.

4. The shield connector according to claim 1, wherein:

the inner conductor is to be connected to an internal conductor of the cable, the cable including a first portion in which the internal conductor is surrounded by an insulation coating and a second portion in which the internal conductor is exposed from the insulation coating, and the stopper portion overlaps the first portion of the cable in a plan view.

* * * * *